May 13, 1958 A. PFAU 2,834,834
CIRCUIT ARRANGEMENT FOR REDUCING THE CALL LOSSES IN TELEPHONE SYSTEMS WITH REGISTERS
Filed Sept. 21, 1953
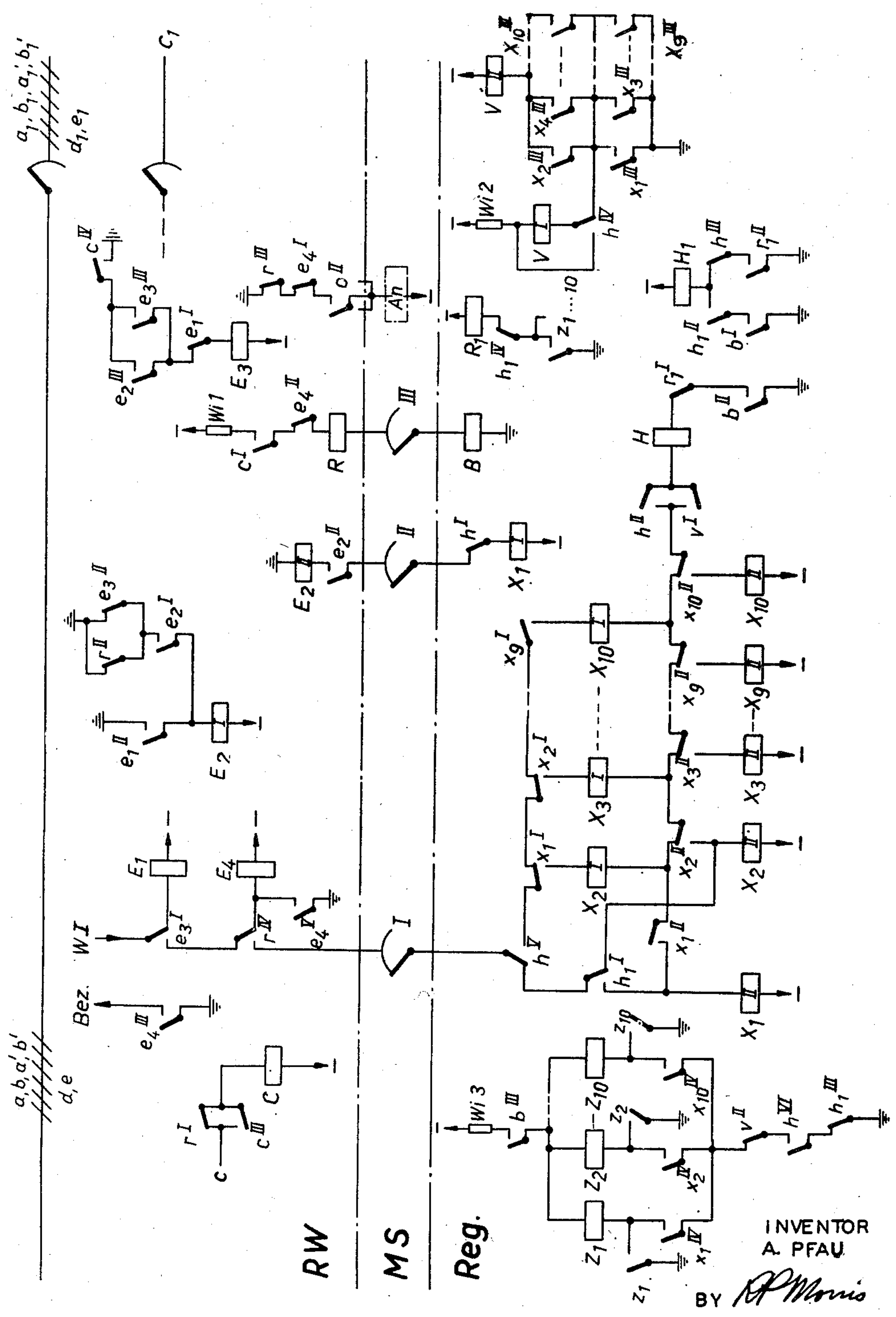
INVENTOR
A. PFAU
BY R P Morris
ATTORNEY United States Patent Office 2,834,834
Patented May 13, 1958

2,834,834

CIRCUIT ARRANGEMENT FOR REDUCING THE CALL LOSSES IN TELEPHONE SYSTEMS WITH REGISTERS

Anton Pfau, Stuttgart, Germany, assignor to International Standard Electric Corporation, New York, N. Y., a corporation of Delaware Application September 21, 1953, Serial No. 381,382

Claims priority, application Germany September 20, 1952

9 Claims. (Cl. 179—16)

The present invention relates to telephone systems using registers, in which selectors, as well as all-relay arrangements, are used as connecting devices. Selectors or switches, as is well known, are employed as connecting links between registers and speaking wires. The setting time, which is required for the connection, causes call losses if the time between the seizing impulse and the first dial impulse is shorter than the setting time. One object of the present invention is to reduce these call losses.

According to the invention therefore, an arrangement is suggested for achieving a reduction of the call losses in that the first, or the first two, dial impulses of the first train of impulses are received by the connecting device to be set (e. g. discriminating selector), are stored and transferred, after the switching-on of the common controlling device (e. g. register), to this device via one or more specially provided control wires, whereas the residual dial impulses are transmitted via a normal control wire and without an intermediate storing to the common controlling device.

For the switching-on of a free register via a switching device to a controlling device, consisting in the present case of a discriminating selector or so-called finder, there are four possibilities with regard to the time, namely:

(1) The register may be connected prior to the arrival of the first dial impulse.

(2) The register is switched-on by the finder between the first and the second dial impulse.

(3) The register is switched-on by the finder at the arrival of the second dial impulse.

(4) No register is available at the arrival of the second dial impulse.

By means of the intermediate storing of the first dial impulses of a train of impulses, an additional time will still be available for the switching-on of a free register, so that in this case a delayed switching-on can be awaited, thereby diminishing the possibilities of call losses. Generally it may be sufficient to store merely the first dial impulse of the first train of impulses in the collecting device and to transmit this first impulse to the register simultaneously with the second dial impulse, the register having been switched-on in the meantime. By this measure the switching-on time will be extended by one impulse, i. e. by 100 milliseconds. By the intermediate storing of the first dial impulse it is possible furthermore to omit the seizing signal, to carry out the seizing of the connecting device, and to comply with the demand of the registers connected therewith, by the first dial impulse itself.

The particulars of the present invention will be described with reference to an example of an embodiment, without the invention being limited to the scope of the shown example. The accompanying circuit diagram shows a discriminating selector RW, a finder MS and a register Reg. In all parts of the circuit diagram only those circuits are shown which are necessary for understanding the invention. The finder MS, serving the switching-on of the register to the discriminating selector, is represented as a rotary selector for reasons of simplicity, although for this purpose also relay-like switches may be used. The employment of relay-like switches has the further advantage according to which no additional relays are necessary for the operation of the discriminating selector, since the magnets available in the switch take over the switching operations which are required for the intermediate registering.

Where relays have more than one winding, each winding is illustrated by its individual rectangle provided with a Roman numeral designating the number of the winding, the number I usually being used to designate the operating winding and other numbers being used to designate "hold" windings. Thus, $E_2$I represents the operating winding of relay $E_2$ and $E_2$II represents the hold winding.

It is assumed that the seizing impulse is applied to the *c*-wire by a transmitting device which is not shown. By this means the seizing relay C will be energized in the discriminating selector RW and will lock over contact $c^{III}$. The test circuit for the switching-on of the register will be prepared by contact $c^{I}$ and the circuit *An* for starting the register will be completed by contact $c^{II}$. Also, a circuit for relay $E_3$ will be prepared at contact $c^{IV}$. The finder MS will then start to hunt for the calling discriminating selector and when its terminal is reached the test circuit is completed for relays B in the register and R is the discriminating selector from ground in the register, via relay B in the register, wiper III of the finder MS, relay R in the discriminating selector, contact $e_4^{II}$, contact $c^{I}$, resistance *Wi1*, to negative battery. This seizes the register by opening the starting circuit at $r^{III}$.

The first positive dial impulse of the first train of impulses will be conducted to the relay $E_1$ via the lead WI and contact $e_3^{I}$ whether or not the register has been seized. Relay $E_1$ is thus operated and opens the circuit for relay $E_3$ to prevent its operating at this time. Relay $E_2$ will be energized by contact $e_1^{II}$. This relay immediately holds itself via the contact $e_2^{I}$ of its own. Relay $E_2$ also prepares the circuit for relay $E_3$. The first dial impulse is now registered in the relay $E_2$ until the switching-on of the register has been performed by the wiper II of the finder.

The transmission of the registered dial impulse to the register will be effected after the connecting through to the register via relay $E_2$(II) and contact $e_2^{II}$, wiper II of the finder MS via contact $h^{I}$ to the relay $X_1$(I). In the meantime, at the termination of the first dial impulse, the relay $E_1$ is de-energized, so that the relay $E_3$ is now energized, via the prepared contact $e_2^{III}$ and the dropped contact $e_1^{I}$. The stepping circuit WI over which the dial impulses are transmitted, will be switched over by contact $e_3^{I}$, and the following dial impulses are then transmitted without an intermediate storing, via the wiper I of the finder MS to the register Reg. because the contact $r^{IV}$ had likewise been reversed at the seizure by the operation of relay R.

It may happen that the first registered dial impulse and the second directly transmitted dial impulse, both of the first train of impulses, are conducted to the register simultaneously but over different wipers of the finder. The delivery of the registered dial impulse is performed, as described above, via the wiper II of the finder MS, whereas all following dial impulses of this train of impulses are conducted to the register via the wiper I of the finder MS.

The dial impulses are received in the register with the aid of a chain of counting relays, consisting of the relays $X_1$–$X_{10}$. The first impulse, applied via the wiper II of finder MS is received by the winding I of the counting relay $X_1$ which operates. Relay V will be operated through the contacts $x_1^{III}$ and $h^{IV}$. Then relay $X_1$ will be locked in the counting chain, via winding $X_1^{II}$, contacts $x_1^{II} \ldots x_{10}^{II}$, $v^I$, winding of relay H, $r_1^I$ and $b^{II}$ (relay B is the seizing relay of the register). Relay H operates in this circuit and by means of contact $h^{IV}$ shorts winding I of relay V, making it slow to release. By means of the contact $h^V$ the chain will be reversed for the reception of the following impulses. By contact $h^I$ the winding of relay $X_1^I$ will be disconnected and the registering of the first impulse in RW is cancelled. Relay $E_2$ in the discriminating selector RW drops.

If the second impulse arrives through wiper I of MS, relay $X_2$ is operated via the contacts $h^V$, $x_1^I$, relay $X_2$ winding I, contact $x_1^{II}$ and relay $X_1$ winding II. Relay $X_2$ closes a circuit at $x_2^{III}$ to hold relay V. Relay $X_1$ makes its own holding circuit through winding II during the impulse. At the end of the second impulse, relay $X_1$ releases. Relay $X_2$ makes a holding circuit via its own winding II and the contacts $x_2^{II}$ to $x_{10}^{II}$, $h^{II}$, relay H and the contacts $r^I$ and $b^{II}$. In this holding circuit relay H remains operated also.

When the third impulse arrives via contacts $h^V$, $x_1^I$, $x_2^I$, relay $X_3$ winding I, contact $x_2^{II}$, and relay $X_2$ winding II, relay $X_3$ operates. Relay $X_2$ remains operated in this circuit during the impulse. Relay $X_3$ holds itself via its winding II etc. Additional impulses operate the X relays successively.

When the first impulse registered in the discriminating selector RW arrives at the register via wiper II of MS and the second impulse simultaneously arrives directly via wiper I of MS, the counting relay $X_1$ will be energized directly via wiper II of MS, contact $h^I$ and relay $X_1$ winding I. At the same time the counting relay $X_2$ will be operated via wiper I, contacts $h^V$ and $h_1^I$ and relay $X_2$ winding II. The relays V and H will be operated as already described. When the relays $X_2$ and H are energized, relays $X_1$ holds itself via contacts $h^V$, $x_1^I$, relay $X_2$ winding I, contact $x_1^{II}$, relay $X_1$, winding II during the second impulse. Then relay $X_1$ releases. The functions of the chain continue as described.

Relay V remains operated during the impulse train. By each impulse of the train relay V gets a supply impulse. When the impulse train is finished relay V releases after a delay by the release of the highest odd numbered X relay. In the counting chain the corresponding relay X operates the associated relay Z from ground via $h_1^{III}$, $h^{VI}$, $v^{II}$, contact IV of operated X relay, winding of corresponding Z relay $b^{III}$, $Wi_3$, to negative battery. By this means the recorded digit will be transmitted from the counting chain to the Z-relays. Relay R1 operates via contacts $h_1^{IV}$ and $z_{1 \ldots 10}$. The latter returns the counting chain of the X relays to the normal condition by the release of any X relays which are then held. The release of relay H is also effected, so that the chain can receive the next impulse train.

Relay $H_1$ operates via the contacts $r_1^{II}$ and $h^{III}$ and locks via the contacts $h_1^{II}$ and $b^I$, and this relay changes over the counting chain at $h_1^I$. By this means the first impulse arriving via wiper I will not be conducted to relay $X_2$ winding II, but to relay $X_1$ winding II. The operation of relay $H_1$ releases relay $R_1$ at $h_1^{IV}$. For the second impulse train the first impulse will not be registered in the discriminating selector RW, because $E_3$ is operated, but will be immediately transmitted via wiper I of finder MS into the register through the contacts $h^V$ and $h_1^I$. Relay $X_1$ operates. During the first impulse, a positive impulse potential is applied from the dial impulse input WI to relay $X_1$ winding II via the contacts $h^V$ and $h_1^I$. Relay $X_1$ operates and immediately afterwards relay V operates too. Relay H cannot operate at this time via the contacts $x_1^{II}$ to $x_{10}^{II}$ because it is thus short circuited. As soon as the first impulse is finished, relay H operates in the circuit already mentioned and changes over the counting chain for the reception of following impulse trains.

In the present embodiment the register is provided for the reception of two impulse trains. It is obvious that the register can be arranged to receive more impulse trains. The reception of the following impulse train is carried out in the same manner as described for the second impulse train.

In case the second dial impulse arrives prior to the switching-on of the register in which case the relay R will not have been energized, then the second dial impulse will be transmitted via the impulse lead WI and the contacts $e_3^I$, $r^{IV}$ to relay $E_4$. Relay $E_4$ will operate and by contacts $e_4^I$ and $e_4^{II}$ the starting lead and the test lead, respectively, leading to the register will be interrupted. By means of contact $e_4^{III}$ a ground will be applied to the busy tone circuit Bez. and a busy tone signal will be given to the calling subscriber.

What is claimed is:

1. A circuit arrangement for telecommunication systems comprising a plurality of selectors arranged in groups a register for each group, means responsive to an impulse from one of said selectors for seizing the register associated therewith and for connecting said register thereto over a plurality of connecting paths, means at each of said selectors for receiving dial impulses, means at each of said selectors for storing a particular number of the first train of dial impulses to be received, means operative subsequent to the connection of a register for transmitting said particular number of stored dial impulses to said connected register over a first path in said connecting means, and means for transmitting succeeding dial impulses over a second path in said connecting means.

2. A circuit arrangement, as defined in claim 1, further comprising means at each selector for rendering the impulse storing means inoperative after the first train of dial impulses has been received and for transmitting the second train of dial impulses directly to the connected register as said second train of impulses is received by said selector.

3. A circuit arrangement, as defined in claim 2 further comprising a chain of relays in the register, means at the register for causing the first impulse of the first train of impulses to be received over the second path of the connecting means to operate the second relay of the chain of relays, and means at the register responsive to the end of the first train of impulses for causing the first impulse of the second train to be received over said second path to operate the first relay of said chain.

4. A circuit arrangement, as defined in claim 3, further comprising means in each selector for preventing the operation of the connecting means if said connecting means has not operated prior to the receipt of the dial impulse following the particular number of impulses to be stored.

5. A circuit arrangement, as defined in claim 4, further comprising means operated by the means for preventing the operation of the connecting means for transmitting a signal to a busy tone circuit.

6. A circuit arrangement, as defined in claim 5, further comprising circuit means at the register for receiving the stored impulses at any time after the initiation of the first dial impulse up to and including the initiation of the transmission of the impulse next succeeding the particular number of stored impulses.

7. A circuit arrangement, as defined in claim 1, further comprising circuit means at the register for receiving the stored impulses at any time after the initiation of the first dial impulse up to and including the initiation of the transmission of the impulses next succeeding the particular number of stored impulses.

8. A circuit arrangement, as defined in claim 1, further comprising means in each selector for preventing the operation of the connecting means if said connecting means has not operated prior to the receipt of the dial impulse following the particular number of impulses to be stored.

9. A circuit arrangement, as defined in claim 8, further comprising means operated by the means for preventing the operation of the connecting means for transmitting a signal to a busy tone circuit.

References Cited in the file of this patent

UNITED STATES PATENTS

| | | |
|---|---|---|
| 2,300,829 | Gooderham | Nov. 3, 1942 |
| 2,562,717 | Holden | July 31, 1951 |